VARACTOR CONTINUOUS PHASE MODULATOR HAVING A RESISTANCE IN PARALLEL WITH THE VARACTOR

Filed Oct. 20, 1966

INVENTOR,
ROBERT V. GARVER
BY Harry M. Saragovitz
Edward J. Kelly, Herbert Berl
& J. D. Edgerton
ATTORNEYS United States Patent Office 3,479,615
Patented Nov. 18, 1969

3,479,615

VARACTOR CONTINUOUS PHASE MODULATOR HAVING A RESISTANCE IN PARALLEL WITH THE VARACTOR

Robert V. Garver, Boyds, Md., assignor to the United States of America as represented by the Secretary of the Army Filed Oct. 20, 1966, Ser. No. 588,693
Int. Cl. H03c *3/20*
U.S. Cl. 332—30 14 Claims

ABSTRACT OF THE DISCLOSURE

A varactor diode modulator is used to provide high frequency phase modulation without degradation of phase linearity or efficiency. The varactor diode reactants is adjusted by selecting diode parameters that will approximate a tan $\theta$ curve as the voltage is varied. The diode is then attached to one part of circulator or similar plural channel device to provide an approximate linear relationship between voltage and phase shift. A resistor is connected in parallel with the varactor diode to produce a reflection coefficient that remains constant with variations of input voltage, thereby overcoming the problem of change in attenuation with change in phase. A 360 degree modulation is achieved without the use of a second circulator by connecting a second varactor in parallel with the first and separating the two varactors by a quarter wavelength line.

This invention relates to phase modulators, and in particular, those phase modulators that utilize diodes.

A need now exists in microwave technology for linear, hysteresis-free, high efficiency, high modulation frequency, constant insertion loss phase modulators. Presently ferrite modulators are extensively used; however these require high power low frequency modulating signals, and such requirements severely limit the usefulness of this type of modulator. Further, because they are ferrite devices they will behave as one would expect ferrite devices to behave in that they exhibit pronounced hysterisis characteristics. To overcome the difficulties encountered with ferrite modulators varactor diode continuous phase modulators are now being extensively used, but these too have disadvantages. Varactor diode modulators have a pronounced non-linear relationship between phase and voltage and are subject to severe insertion loss variations with change in phase. C. S. Kim, et al. (Digest of Technical Papers, 1966 International Solid State Circuits Conference) have disclosed a varactor diode phase modulator in which phase and voltage have a linear relationship; however variations in insertion loss with change in phase were still found to be present. Further, the linearization of the phase response of this device was accomplished using many space consuming components, for example, two diodes and six quarter wavelength lines were required for 180 degree modulation. Such a technique would produce a prohibitively large structure at low frequencies. Even a larger number of components would be required in such a device to produce 360 degree modulation.

It is therefore an object of this invention to provide a microwave phase modulator in which the phase is a linear function of the applied modulating voltage.

Another object of this invention is to provide a phase modulator requiring a very low power modulating signal.

A further object of this invention is to provide a phase modulating means in which high frequency modulation may be accomplished without degradation of phase linearity or efficiency.

An additional object of this invention is to provide a means which will yield at least 360 degree phase modulation in one configuration whereby a sawtooth modulating signal applied thereto will produce single-sideband modulation.

Still another object of this invention is to provide an improved microwave phase modulator which requires a minimum of space and few components.

An additional object of this invention is to provide a continuous diode phase modulator in which insertion loss remains constant with variations in voltage.

Briefly, in order to realize the above and other objects a varactor diode modulator is used. The varactor diode used has a reactance that is adjusted by selecting didoe parameters that will approximate a tan $\theta$ curve as the voltage is varied. This diode is then attached to one part of a circulator or similar plural channel device to provide approximately a linear relationship between voltage and phase shift. To overcome the problem of change in attenuation with change in phase a resistor is connected in parallel with the varactor diode which will produce a reflection coefficient that remains constant regardless of input voltage variations. In order to obtain 360 degree modulation without using a second circular or similar device a second varactor diode is connected in parallel with the first mentioned varactor diode, the two being separated by a quarter wavelength line.

The specific nature of the invention, as well as other objects, aspects, uses and advantages thereof, will clearly appear from the following description and from the accompanying drawings, in which.

Figure 1:
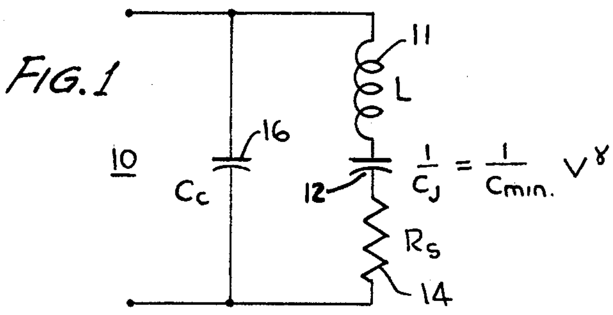
FIGURE 1 is the equivalent circuit of a varactor diode.

Referring to FIGURE 1, varactor diode 10, when mounted in a transmission line, has an equivalent circuit which includes series inductance 11, junction capacitance 12, series resistance 14, and cartridge capacitance 16. The effects introduced by capacitance 16 and resistance 14 are either negligible or they can be made negligible. Capacitance 16 can be tuned out by resonating it with a parallel inductor at any given frequency of operation, and in this particular application spreading resistance 14 has been found to be negligibly small. For this reason capacitance 16 and resistance 14 can be ignored, and the reactance of the diode may be represented as follows:

$$X=\omega L-\frac{1}{\omega C}\min V$$

where:

- V=normalized value of the diode voltage, e.g. V=0 at the contact potential and V=1 at the breakdown voltage,
- $\gamma$=½ (typically), and
- C min=capacitance of the varactor junction at or near the maximum possible reverse bias voltage.

This expression can be normalized to yield the following expression:

$$\omega=XC\ \min=\omega^2LC\ \min-V^{1/2}$$

Figure 2:
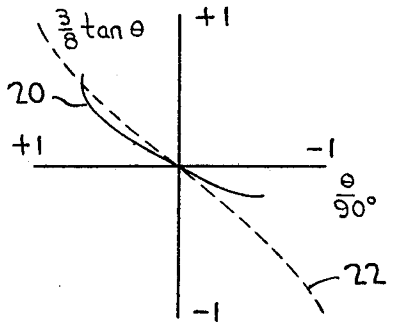
FIGURE 2 is a superposition of the curve representing the normalized reactance of the varactor diode and the ⅜ tan $\theta$ curve.

As shown in FIGURE 2 this normalized reactance expression when plotted as a function of V can be superimposed on the ⅜ tan $\theta$ curve 22 when plotted as a function of $\theta/90°$. The normalized reactance can as well be plotted on a Smith chart, where incremental changes in V will produce like incremental changes in the phase angle of the reflection coefficient. The equation of this curve is:

$$\frac{R}{Z_0}+j\frac{X}{Z_0}=\frac{R_s}{Z_0}+j\left(\frac{\omega L}{Z_0}-\frac{1}{\omega C_{\text{min.}} Z_0}V^{1/2}\right)$$

where: $Z_0$=characteristic impedance of the transmission line. It will be found that the center of this curve will not coincide with the center of the Smith chart. Therefore, it will be readily seen that the magnitude of the reflection coefficient will change with changes in V. If one should plot the normalized admittance of the diode, it will be found that the center of this curve in relation to the center of the reactance curve and the center of the Smith chart will be positioned so that by adding conductance to the admittance a curve may be obtained that has its center at the center of the Smith chart. The magnitude of the conductance so added may be found by the equation:

$$Rp=\frac{Z_0^2}{R_s}$$

The result of adding conductance to the diode admittance in the above described manner will be that the magnitude of the reflection coefficient will remain constant with variations of V.

Figure 3:
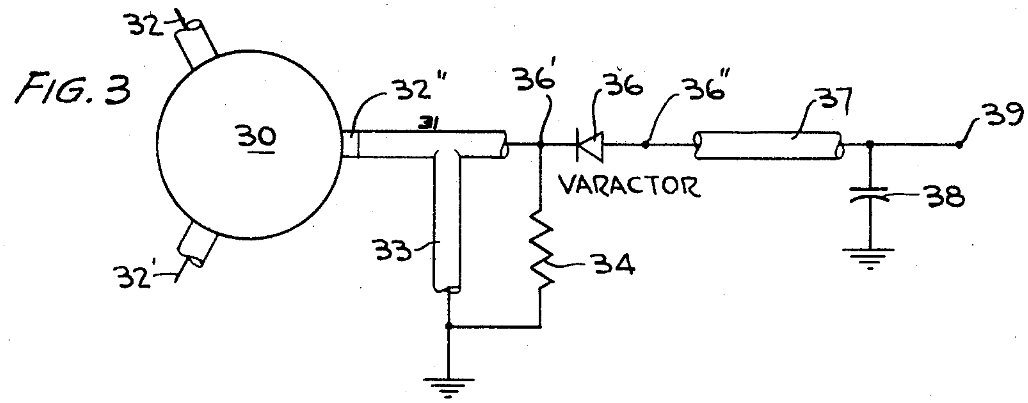
FIGURE 3 is a schematic diagram of a typical embodiment of the invention.

In FIGURE 3, in a typical embodiment of the invention, the radio frequency power to be modulated enters port 32 of circular 30 and emerges from port 32′. The circulator by means of port 32″ and transmission line 31 is connected in series to the junction terminal of varactor diode 36 which arrangement allows the varactor diode to be represented as in FIG. 1. The other terminal 36″ of the varactor diode is connected in series with a length of transmission line 37 which is R.F. short-circuited by capacitor 38 to provide the desired inductance to satisfy the above equations. A short length of high impedance transmission line 33 is connected to the input of varactor diode 36 with its other end being connected to ground. By properly adjusting the length and characteristic impedance of transmission line 33 it is possible to obtain the necessary inductance with which cartridge capacitance 16 (FIG. 1) may be parallel resonated at the frequency of operation. The conductance which is added to make the reflection coefficient invariant with voltage is represented by resistor 34 placed in parallel with transmission line 33 which must be a well-designed non-reactive resistance at the frequency of operation. Modulating voltage is introduced into the network by a fine wire 39 connected in series with transmission line 37 and varactor diode 36.

In operation equal increments of voltage across the diode will produce equal increments of phase shift of the reflection coefficient of the diode which will, in turn, provide equal increments of phase shift throughout the network. By using parallel resistance 34 the magnitude of the reflection coefficient will remain constant thereby producing constant transmission loss in the system. This embodiment has the property that 180 degrees rotation on the Smith chart produces substantially a 180 degree phase change in the network. For 180 degree phase modulation this approximation is within plus or minus 2.6 degrees.

Figure 4:
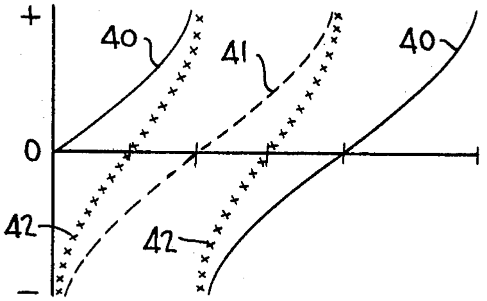
FIGURE 4 is a representation of the addition of two tan $\theta$ functions to provide a tan $2\theta$ function.

FIGURE 4 demonstrates that two varactor diodes each having an admittance characteristic approximately conforming to a tan $\theta$ function can be added to provide a tan $2\theta$ function and 360 degree modulation. Curves 40 and 41 represent the two tan $\theta$ curves which are to be added. The phase shift which exists between curves 40 and 41 may be obtained by placing a quarter wavelength line section between the two diodes as will be discussed in relation to FIGURE 5. The result of this addition step is tan $2\theta$ curve 42.

Figure 5:
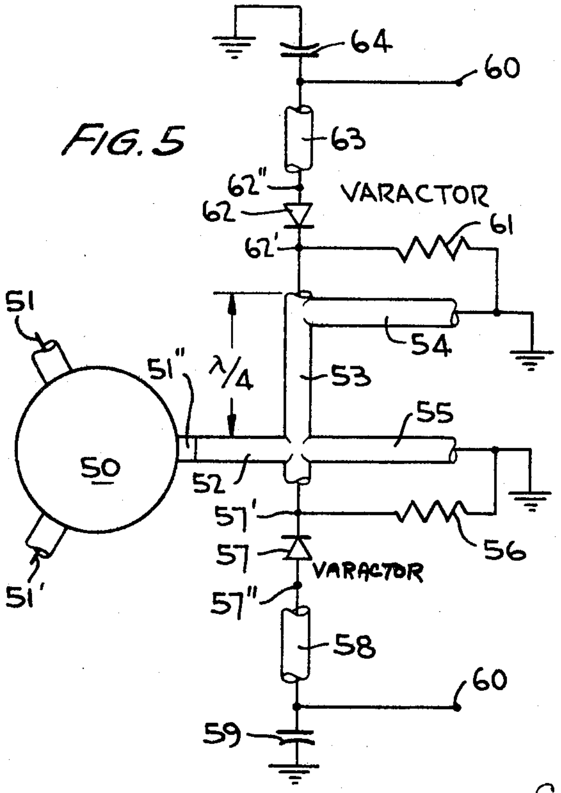
FIGURE 5 is a schematic diagram of another typical embodiment of my invention which will produce 360 degree modulation.

In FIGURE 5 is shown a typical embodiment of the circuitry used to obtain 360 degree modulation. The radio frequency energy to be modulated enters circulator 50 through port 51 and emerges from port 51′. Circulator 50 is connected to the diode network through port 51″ and transmission line 52 which must be adjusted to have a characteristic impedance of $Z_0/2$ in order to provide the desired linearity of phase shift and constancy of insertion loss. Varactor diodes 57 and 62 are separated by quarter wavelength line section 53 and connected thereto by terminals 57′ and 62′, respectively. The other terminals, 57″ and 62″ of the varactor diodes are connected, respectively, to transmission lines 58 and 63 to which are connected capacitors 59 and 64. Capacitors 59 and 64 provide an R.F. short circuit to ground for the transmission lines to which they are connected thereby providing a certain amount of necessary inductance. Short lengths of transmission line 54 and 55 are connected to the inputs of varactor diodes 62 and 57, respectively, at one end and to ground at the other end whereby by properly adjusting the impedance of each line section the cartridge capacitance of the particular diode to which each line section is connected can be parallel resonated. Parallel resistances 56 and 61 are connected in parallel with line sections 55 and 54, respectively and as discussed with relation to FIGURE 3 provide the necessary admittance to maintain constant insertion loss with changes in voltage. Modulation voltage is introduced into the network by fine wires 60. The operation of this embodiment is similar to the operation of the embodiment of FIGURE 3 differing only in that a 360 degree phase shift is now possible with a linearity of plus or minus five degrees, because of the second varactor diode.

This invention may be practiced by using other plural channel reflection devices such as directional couplers, hybrid rings, or magic T's instead of a circulator. For example, if one of the varactor diode circuits as described with reference to FIGURE 3 is placed in each of the normally coupled arms of a 3 db coupler, reciprocal phase modulation of the power out of the normally isolated arm will be produced. Any form of electrical circuitry may be used to construct the invention; for example, either stripline, coaxial line, waveguide or any other form of TEM circuitry may be used. The R.F. shorting capacitors and input leads may be replaced by filters which can be designed using state of the art techniques to permit the phase modulator to be controlled at very high modulation.

It will be apparent that the embodiments shown are only exemplary and that the various modifications can be made in construction and arrangement within the scope of the invention.

I claim as my invention:

1. An improved continuous diode phase modulator having a linear phase-voltage relationship while maintaining a constant insertion loss comprising:

(a) a plural channel reflecting means, (b) a varactor diode, (c) connecting means for connecting said varactor diode to said plural channel reflecting means, said reflecting means including an inductive means adjusted to be in parallel resonance with the cartridge capacitance of said varactor diode, (d) resistance means connected in parallel with said varactor diode thereby establishing a constant insertion loss, (e) means for introducing a modulating voltage into the diode network connected in series with said varactor diode and connected to the end of said varactor diode opposite the end connected to said plural channel reflecting means, and (f) means for introducing a carrier voltage to be modulated.

2. The improved continuous diode phase modulator of claim 1 wherein said varactor diode has an admittance characteristic selected to conform substantially to a tan $\theta$ curve.

3. The improved continuous diode phase modulator of claim 1 wherein said plural channel reflecting means is is connected to said plural channel reflecting means.

4. The improved continuous diode phase modulator of claim 1 wherein said plural channel reflecting means is a circulator.

5. The improved continuous diode phase modulator of claim 2 wherein the junction end of said varactor diode is connected to said plural channel reflecting means.

6. A continuous diode phase modulator utilizing a minimum number of components and space and exhibiting a linear relationship between phase and voltage while maintaining constant insertion loss comprising:

(a) a circulator,
(b) a varactor diode having an admittance characteristic substantially conforming to a tan $\theta$ curve,
(c) first transmission line means connecting the junction end of said varactor diode to a port on said circulator, said transmission line means including a line section in parallel with said varactor diode having one end connected to said transmission line and the other end connected to a common point of potential,
(d) second transmission line means having one end connected to the end of said varactor diode opposite said junction end,
(e) means for introducing a modulating voltage into the modulator, said last-named means being connected to the other end of said second transmission line means, and
(f) a capacitor connected between said other end of said second transmission line means and a common point of potential, and
(g) means for introducing a carrier voltage to be modulated.

7. An improved continuous diode phase modulator for providing 360 degree modulation utilizing a minimum number of components and exhibiting a linear phase-voltage relationship, comprising:

(a) one plural channel reflecting means,
(b) two varactor diodes,
(c) a quarter wavelength transmission line connecting the varactor diodes, said transmission line including an inductive means adjacent each end whereby the cartridge capacitances of said varactor diodes are parallel resonated with said inductive means,
(d) a transmission line means having one end connected between said varactor diodes to said quarter wavelength transmission line adjacent to one end thereof and the other end to a port of said plural channel reflecting means, and
(e) means for introducing a modulating voltage into the network connected to the other end of each said varactor diode opposite the end connected to said quarter wavelength transmission line, and
(f) means for introducing a carrier voltage to be modulated.

8. The improved continuous diode phase modulator of claim 7 further comprising parallel resistances connected across each said varactor diode thereby maintaining a constant insertion loss with variations in voltage.

9. The improved continuous diode phase modulator of claim 7 wherein the end of each said varactor diode that is connected to said quarter wavelength transmission line is the junction end.

10. The improved continuous diode phase modulator of claim 7 wherein each said varactor diode has an admittance characteristic substantially conforming to a tan $\theta$ curve.

11. The improved continuous diode phase modulator of claim 10 further comprising parallel resistances connected across each said varactor diode thereby maintaining a constant insertion loss with variations in voltage.

12. The improved continuous diode phase modulator of claim 11 wherein the end of each said varactor diode that is connected to said quarter wavelength transmission line is the junction end.

13. The improved continuous diode phase modulator of claim 12 wherein said transmission line connecting said plural channel reflecting device and said quarter wavelength line is adjusted to have a characteristic impedance equal to one-half the characteristic impedance of the remainder of the modulator circuit.

14. The method of obtaining 360 degree modulation using a single plural channel reflecting device and without using two 180 degree modulators comprising the step of: connecting a pair of varactor diodes, one to each end of a quarter wavelength line, each of said varactor diodes having admittance characteristics substantially conforming to a tan $\theta$ curve, so that the diode admittances add to conform to a tan $2\theta$ curve.

References Cited

UNITED STATES PATENTS

| | | | |
|---|---|---|---|
| 3,422,378 | 1/1969 | La Rosa. | |
| 2,822,523 | 2/1958 | Bargellini | 332—16 |
| 3,153,206 | 10/1964 | Fisher | 332—30 X |
| 3,243,731 | 3/1966 | Erickson | 332—30 X |
| 3,304,518 | 2/1967 | Mackey | 332—16 X |
| 3,373,381 | 3/1968 | Thomas | 332—29 |

ALFRED L. BRODY, Primary Examiner

U.S. Cl. X.R.

307—320; 328—16; 331—36; 332—16; 333—1.1